(12) United States Patent
Hiljanen

(10) Patent No.: US 9,828,726 B2
(45) Date of Patent: Nov. 28, 2017

(54) METHOD AND SYSTEM FOR TREATING LIGNIN

(71) Applicant: Valmet Technologies Oy, Espoo (FI)

(72) Inventor: Seppo Hiljanen, Pori (FI)

(73) Assignee: VALMET TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/912,730

(22) PCT Filed: Aug. 8, 2014

(86) PCT No.: PCT/FI2014/050614
§ 371 (c)(1),
(2) Date: Feb. 18, 2016

(87) PCT Pub. No.: WO2015/025076
PCT Pub. Date: Feb. 26, 2015

(65) Prior Publication Data
US 2016/0208436 A1    Jul. 21, 2016

(30) Foreign Application Priority Data
Aug. 19, 2013   (FI) ...................................... 20135842

(51) Int. Cl.
| C01B 31/02 | (2006.01) |
| D21C 11/00 | (2006.01) |
| C07G 1/00 | (2011.01) |
| C01B 32/00 | (2017.01) |
| C01B 32/05 | (2017.01) |

(52) U.S. Cl.
CPC .......... *D21C 11/0007* (2013.01); *C01B 32/00* (2017.08); *C01B 32/05* (2017.08); *C07G 1/00* (2013.01); *Y02E 50/14* (2013.01)

(58) Field of Classification Search
CPC .................................................... C01B 32/05
See application file for complete search history.

(56) References Cited

U.S. PATENT DOCUMENTS

| 3,886,093 | A * | 5/1975 | Dimitri ................... B01J 37/08 |
|           |     |        | 201/25 |
| 2008/0006518 | A1 | 1/2008 | Shimojo et al. |
| 2008/0032344 | A1 | 2/2008 | Fallavollita |
| 2008/0317661 | A1 | 12/2008 | Eckert et al. |
| 2010/0325947 | A1 | 12/2010 | Ohman et al. |
| 2012/0103040 | A1 | 5/2012 | Wolf et al. |
| 2014/0271443 | A1 | 9/2014 | Baker et al. |
| 2016/0038913 | A1 | 2/2016 | Vyskocil et al. |

FOREIGN PATENT DOCUMENTS

| CN | 1249373 A | 4/2000 |
| CN | 101952504 A | 1/2011 |
| EP | 1797236 B1 | 6/2011 |
| EP | 1794363 B1 | 2/2012 |
| EP | 2796561 A1 | 10/2014 |
| EP | 2982649 A1 | 2/2016 |
| JP | 2011-178851 A | 9/2011 |
| WO | WO 2006/038863 A1 | 4/2006 |
| WO | WO 2009/104995 A1 | 8/2009 |
| WO | WO 2012/119875 A1 | 9/2012 |
| WO | WO 2013/002687 A1 | 1/2013 |
| WO | WO 2013/070130 A1 | 5/2013 |
| WO | WO 2013/112100 A1 | 8/2013 |
| WO | WO 2014/096544 A1 | 6/2014 |

OTHER PUBLICATIONS

Finnish Patent and Registration Office, Office Action for Application No. 20135842, dated Mar. 19, 2014, 6 pages, Finland.
International Searching Authority, International Search Report and Written Opinion for International Application No. PCT/FI2014/050614, dated Jan. 14, 2015, 9 pages, European Patent Office, The Netherlands.
Kang, Shimin, et al., "Characterization of Hydrochars Produced by Hydrothermal Carbonization of Lignin, Cellulose, D-Xylose, and Wood Meal", *Industrial & Engineering Chemistry Research*, Jul. 4, 2012, pp. 9023-9031, vol. 51, No. 26, ACS Publications, U.S.A.
Kang, Shimin, et al., "Solid Fuel Production by Hydrothermal Carbonization of Black Liquor", *Bioresource Technology*, Apr. 2012, pp. 715-718, vol. 110, Elsevier Ltd., U.K.
Libra, J. A., et al., "Hydrothermal carbonization of biomass residuals: comparative review of the chemistry, processes and applications of wet and dry pyrolysis", *Biofuels*, 2011, pp. 89-124, vol. 2, Future Science Ltd, U.K.
Marton, Joseph, "On the Structure of Kraft Lignin", *TAPPI*, Nov. 1964, pp. 713-719, vol. 47, No. 11, Technical Association of the Pulp and Paper Industry, U.S.A.
Valmet Corporation, "LignoBoost™: Lignin from Kraft Black Liquor (Brochure)", Mar. 2014, Finland.
State Intellectual Property Office of the P.R.C., First Office Action for Application No. 201480045942.X, dated Dec. 7, 2016, 14 pages, China.
State Intellectual Property Office of the P.R.C., Second Office Action for Application No. 201480045942.X, dated May 19, 2017, 13 pages, China.

* cited by examiner

*Primary Examiner* — Stuart Hendrickson
(74) *Attorney, Agent, or Firm* — Alston & Bird LLP

(57) ABSTRACT

The invention provides a method and a system for separating lignin from a lignin containing liquid medium, such as pulp mill black liquor, and treating the separated lignin. The method comprises at least the following steps: a) a precipitation stage (1), wherein a pH lowering agent (A) is added to the lignin containing slurry for precipitating lignin, b) followed by a first separation stage (2), wherein the precipitated lignin is separated as a lignin cake from the remaining liquid phase of the lignin containing slurry, c) a suspending stage (3), wherein the lignin cake is suspended for obtaining a lignin suspension, d) a hydrothermal carbonization stage (4), wherein the lignin suspension is treated for obtaining a slurry of carbon containing material, and e) a second separation stage (5), wherein the carbon containing material is separated from the slurry.

15 Claims, 1 Drawing Sheet

METHOD AND SYSTEM FOR TREATING LIGNIN

CROSS REFERENCE TO RELATED APPLICATIONS

This application is a National Stage Application, filed under 35 U.S.C. 371, of International Application No. PCT/FI2014/050614, filed Aug. 8, 2014; which claims priority to Finnish Application No. 20135842, filed Aug. 19, 2013; the contents of both which are hereby incorporated by reference in their entirety.

BACKGROUND

Related Field

The present invention relates to a system and a method for separating lignin from a lignin containing liquid medium, such as pulp mill black liquor, and treating the separated lignin according to the independent claims presented below. The invention also relates to a carbon containing product obtainable by the method of the invention and a use of the carbon containing product.

Description of Related Art

It is previously known to extract lignin, a component of wood, from pulp mill black liquor. Lignin can be used as a fuel. However, a benefit of the separated lignin as a fuel is low in comparison to the black liquor used direct as a fuel in the soda recovery boiler. Thus, the value of the separated lignin correlates to its fuel value, and so the profitability of the lignin separation process or other down streaming process is usually not sufficient for investments.

The known process for separating lignin from pulp mill black liquor comprises the following stages in sequence:
- precipitation of lignin by a first precipitation stage of the pulp mill black liquor where the pH of the black liquor is lowered by adding a pH lowering agent, preferably $CO_2$
- followed by a first dewatering stage while forming a first filter cake,
- suspending the first filter cake in a second precipitation stage using a second acid or mixture of acids, wherein a lignin suspension is obtained,
- dewatering the lignin suspension by a second dewatering stage for forming a second filter cake,
- washing the second filter cake by adding a wash liquid to this washing stage, and
- dewatering the washed second filter cake obtaining a lignin product, said dewatering is typically made in the last stage of the wash apparatus.

Typically, the above described process is connected to the recovery operations receiving black liquor from a digester of the pulp mill.

The method is known for example from European patent EP 1797236 B1 and US Patent Application US 2010/0325947 A1.

At the time of filing this application, the above described process for separating lignin is sold under the trademark LignoBoost™. The LignoBoost process produces a lignin product which can be used as a fuel.

BRIEF SUMMARY

It is an aim of the present invention to present a novel process using the lignin obtained from plant material for converting it to more refined products.

The aim of the invention is to provide a method and a system for separating lignin from a lignin containing liquid medium, especially spent liquors resulting from biomass fractionation, such as pulp mill black liquor, and further processing the separated lignin in connection with the pulp mill so that the process is cost-effective.

It is especially an aim of the present invention to provide a method and a system which increases the value of the lignin and so the lignin can be utilized also in other solutions as a fuel.

One further aim is to recover carbon from lignin-containing liquid mediums by a method that has high carbon-efficiency.

One further aim is to provide a method that can be integrated in the kraft (sulphate) pulping process in a chemical pulp mill.

In order to achieve among others the aims presented above, the invention is characterized by what is presented in the characterizing parts of the enclosed independent claims.

The embodiments and advantages mentioned in this text relate, where applicable, both to the system and to the method according to the invention, even though it is not always specifically mentioned.

In the method, lignin is precipitated from a lignin containing liquid medium and thereafter subjected to a hydrothermal carbonization process in a wet state, whereafter carbon containing material (carbon-rich material) derived from the lignin as the result of the carbonization is recovered.

The carbonized material (carbon containing material) is the result of hydrothermal carbonization (HTC) process, which can be performed for lignin which exists in suspension in the HTC process. This carbon containing material, to which the lignin is converted in this process, can be described as "HTC-carbon". During the HTC process the carbon content of the material increases compared with the original lignin raw material. The method is characterized by high carbon efficiency. No drying of the lignin is required to make the carbon containing product, because the HTC process is carried out when the raw material is in suspension, and the result is a slurry of carbon containing material.

The precipitated lignin may contain also other organic components originating from the biomass. These components are also converted to the HTC carbon in the HTC process along with the lignin.

The composition of the lignin liquid medium and the form of lignin therein is dependent on the preceding process and its conditions where lignin has entered this liquid medium. The liquid medium is preferably an aqueous medium, where lignin can exist as solution, colloidal dispersion or slurry. For example it is known that the lignin is either dissolved or dispersed in black liquor in the colloidal form, depending on the pH of the black liquor and lignin molecular weight. The colloidal dispersion is stabilized by charged phenolic and carboxylic acid groups on the lignin (Marton, J., On the structure of kraft lignin, Tappi, 47(11), 713-719 (1964). In the precipitation of the lignin from the liquid medium, lignin of such an increased particle size is created which can be separated from the liquid medium by physical methods, especially by filtration.

The method is suitable especially for converting the lignin of spent liquor from a biomass fractionation method to carbon-rich product. The biomass fractionation method is a method where lignin is separated from the rest of biomass and which produces lignin-containing spent liquor. The fractionation method is especially a process where lignin is separated from cellulose in a process which can be called delignification, and it can be sulphite, soda, or kraft (sulphate) delignification process. Thus, the spent liquor can be for example black liquor from kraft cooking.

The separated lignin in a wet state, which can be for example an aqueous suspension of lignin, is fed to the HTC process. The lignin for the HTC process is obtained in the separation process of lignin from a lignin containing liquid medium. This separation process comprises precipitation of lignin. The precipitated lignin in an aqueous suspension is carbonized in the HTC process to an aqueous slurry of carbon containing material.

Any suitable separation method for separating the lignin from the spent liquor can be used. If the spent liquor is alkaline, the lignin can be separated through precipitation by lowering the pH.

A typical method according to the invention for separating lignin from a lignin containing alkaline liquid medium, such as pulp mill black liquor, and treating the separated lignin comprises at least the following steps:
- a precipitation stage, wherein pH lowering agent is added to the lignin containing alkaline liquid medium for precipitating lignin,
- followed by a first separation stage, wherein the precipitated lignin is separated as from the remaining liquid phase of the lignin containing slurry,
- a suspending stage, wherein the precipitated and separated lignin is suspended or dissolved for obtaining a lignin suspension,
- a hydro thermal carbonization stage, wherein the lignin suspension is treated for obtaining a slurry of carbon containing material (HTC carbon) as a product, and
- a second separation stage, wherein the carbon containing material (HTC carbon) is separated from the slurry.

A typical system according to the invention comprises
- a precipitating unit for precipitating lignin of the lignin containing liquid medium,
- a first separating unit, especially a filtration unit, for separating the precipitated lignin from the remaining liquid phase of the lignin containing liquid medium,
- a suspending unit for suspending the precipitated and separated lignin
- a hydro thermal carbonization reactor (HTC reactor), and
- a second separating unit for separating carbon containing material
  (HTC carbon) from slurry of the carbon containing material obtained in the hydro thermal carbonization.

The present invention also provides a carbon containing product obtainable by the method according to the invention, and a use of the carbon containing product for replacing a fossil carbon as a raw material, e.g. in the production of the tyres or the steel or as raw material in activated carbon production.

It is intended throughout the present description that the expression "lignin containing liquid medium" is any liquid, which contains lignin in dissolved or dispersed form, especially any spent liquor from a biomass fractionating process. This liquid may be a process liquor containing lignin as a result of biomass fractionation in a chemical pulp mill. The origin of the lignin is wood or other biomass such as straw that has been digested in the pulp mill in a process called cooking to prepare chemical pulp. The composition of the spent cooking liquor depends on the cooking method. The spent liquor from kraft (sulphate) cooking which is obtained after the separation of the pulp is called black liquor and it contains dissolved and dispersed organic wood material and residual alkali compounds. In the following description, the method is described mainly with reference to black liquor. The method can be applied to all above-mentioned liquids containing lignin.

The present invention is based on the increasing of the value of the lignin by combining a lignin separation process and a hydrothermal carbonization (HTC) process.

For example in initial separation of lignin, the lignin is separated from a lignin containing liquid medium, such as pulp mill black liquor, by lowering the pH of the liquid medium to a point where the lignin precipitates. The hydrothermal carbonization in turn is based on the carbonization of organic matter at a high temperature and at a high pressure in an aqueous phase. So, the aim of the method of the invention is to produce a carbon containing product, technical carbon, which can replace conventional carbon products from fossil sources, from the lignin separated from lignin containing liquid medium.

Thus, a method according to the invention comprises a precipitation stage, wherein pH lowering agent is added to the lignin containing liquid medium for precipitating lignin. The pH lowering agent is preferably carbon dioxide, which is usually well available at low cost. The precipitation can be carried out in any suitable precipitation reactor.

Any other agent that lowers the pH of the lignin containing slurry can be used instead of carbon dioxide. The pH can be lowered for example by adding acid or a mixture of acids.

The pH of the lignin containing liquid medium is lowered by the ph lowering agent to a range which is still alkaline but low enough for precipitation of lignin, usually 9.5-10.5.

The pH to which the pH of the liquid medium is lowered can be used for controlling the particle size of the precipitated lignin, which in turn can be used to influence the particle size of the product after the HTC process (HTC carbon).

After the precipitation stage, the precipitated lignin is separated from the remaining liquid phase of the lignin containing liquid medium in a first separation stage, while forming a lignin cake with high content of lignin. The separation can be carried out by any means for dewatering. Preferably the separation is performed by using centrifugation, a filter press apparatus, a band filter, a rotary filter, such as drum filter, or a sedimentation tank, or similar equipment. According to a preferred embodiment of the invention the first separation stage is performed in a filter press apparatus.

According to an embodiment of the invention, the lignin containing liquid medium is black liquor taken from the recovery system of pulp mill black liquor, and the filtrate of the first separation stage is re-circulated to the recovery system of pulp mill black liquor. The black liquor for the lignin precipitation can be taken at any point between the digester and the recovery boiler. It is taken preferably from the evaporation stage of the black liquor, from a point where it has not yet reached the final concentration suitable for burning in the recovery boiler, and after separation of the lignin the remaining liquid is returned to the evaporation stage.

According to an embodiment of the invention the lignin obtained in the first separation stage, especially in the form of lignin cake, is suspended in water or circulation water in a dissolving/suspending stage, wherein a lignin suspension is obtained. The suspension can be made in any suitable tank.

Acid can be added to water which is used in the suspending stage, to adjust the pH. Also other substances such as catalysts or substances that modify the properties of the carbon containing material can be added.

In a preferred embodiment, circulation water is used in the suspending stage of the lignin. The circulation water is preferably water remaining after the HTC stage, after the separation of the carbon containing material (HTC carbon) from the slurry of the carbon containing material.

In a preferred embodiment of the invention, the hydro thermal carbonization is arranged after the first separation and suspending stage of the lignin separation process, because in the suspending stage, the concentration of the lignin in the lignin suspension can be set high enough for the subsequent hydro thermal carbonization. According to an embodiment of the invention the lignin suspension is heated to a temperature of about 150 to 250° C. at a pressure of about 20 to 40 bar in the hydro thermal carbonization stage for obtaining slurry of carbon containing material. Typically, the HTC stage comprises at least a HCT reactor, in which the HTC reaction is carried out, and in which reactor the temperature and the pressure can be controlled and adjusted. In a typical embodiment of the invention the lignin suspension is kept in the HTC reactor for at least one hour in order that a major part of lignin and other organic matter present in the suspension is converted into carbon containing material of uniform quality. The reaction time in the HTC reactor may thus be for example about 10 hours. An optimum reaction time is 2 to 4 hours. The HTC reaction is exothermic. About 2 tons of lignin is needed to produce about 1.5 ton of the carbon containing material where the carbon content is enriched as an end product. The material released from lignin during this conversion is mainly water. Catalysts can be used in the HTC reaction.

A composition of the carbon containing material product (HTC carbon) obtained as the product by the method according to the invention is dependent on the process conditions of the HTC stage.

Still according to one embodiment, the pH of the separated lignin in a wet state fed to the HTC process is adjusted to control the particle size of the HTC carbon. The pH of the lignin in a wet state, for example a lignin suspension, is adjusted to above 7, preferably above 8 before the HTC stage.

In an embodiment of the invention, the HTC stage also comprises at least one preheating unit before the HTC reactor and/or a cooling unit after the HTC reactor. The lignin suspension can be preheated near to the process temperature before conveying the lignin suspension to the hydro thermal carbonization reactor. The preheating can be carried out by using at least one heat exchanger or a steam heater or a combination of them.

After the HTC reaction, the overpressure is relieved and the slurry of carbon containing material is discharged form the HTC reactor.

After the hydro thermal carbonization stage, the method according to the invention comprises a second separation stage, wherein the carbon containing material is separated from the slurry of the carbon containing material formed in the HTC reaction. The separation can be carried out by any means for dewatering. According to a preferred embodiment of the invention the second separation stage is performed in a filter press apparatus. The hot slurry from the HTC reactor is preferably led through a heat exchanger, which is used for preheating the lignin suspension before the reactor and at the same time for cooling the hot slurry, and it is finally led through a cooler.

The second separation stage produces carbon containing material as a final product and a filtrate. In a typical embodiment of the invention the filtrate of the second separation stage is circulated back to the suspending stage and/or to a flow of the lignin containing medium in the pulp mill, preferably before the evaporator stage. The sodium is released during the HTC reaction from the lignin and it will return to the lignin containing medium.

The system according to the invention also comprises required connection pipes, pumps, valves, control and adjustment means, which are needed to the operation of the system.

In a preferred embodiment of the invention the system of the invention is integrated in a part of the lignin separation system of the pulp mill. In an embodiment of the invention part of the spent liquor flow, especially black liquor flow, that is supplied to the recovery boiler is taken to the precipitation of lignin. At least part or all of the precipitated lignin is fed to the HTC reactor for obtaining a carbon containing product. Thus, the HTC plant producing the carbon containing product can be integrated in a chemical pulp mill to produce carbon containing material as a byproduct of the chemical pulping process.

A carbon product obtained by the method according to the invention can be used e.g. for replacing a carbon originated in fossil source. A carbon product obtained by the method according to the invention can be used for example as a raw material for the production of the tyres. The carbon product obtained by the method according to the invention can also be used as a raw material of the steel production, and for producing electrode carbon. The product can also be used as raw material in activated carbon production.

BRIEF DESCRIPTION OF THE FIGURES

The invention will be described in more detail with reference to the appended drawings, in which.

DETAILED DESCRIPTION OF VARIOUS EMBODIMENTS

Although the following example concerns mainly the processing of black liquor that is a part of the chemical cycle of a kraft pulp mill, the details of the example can be applied in processing of other spent liquors of chemical pulping as well.

Figure 1:
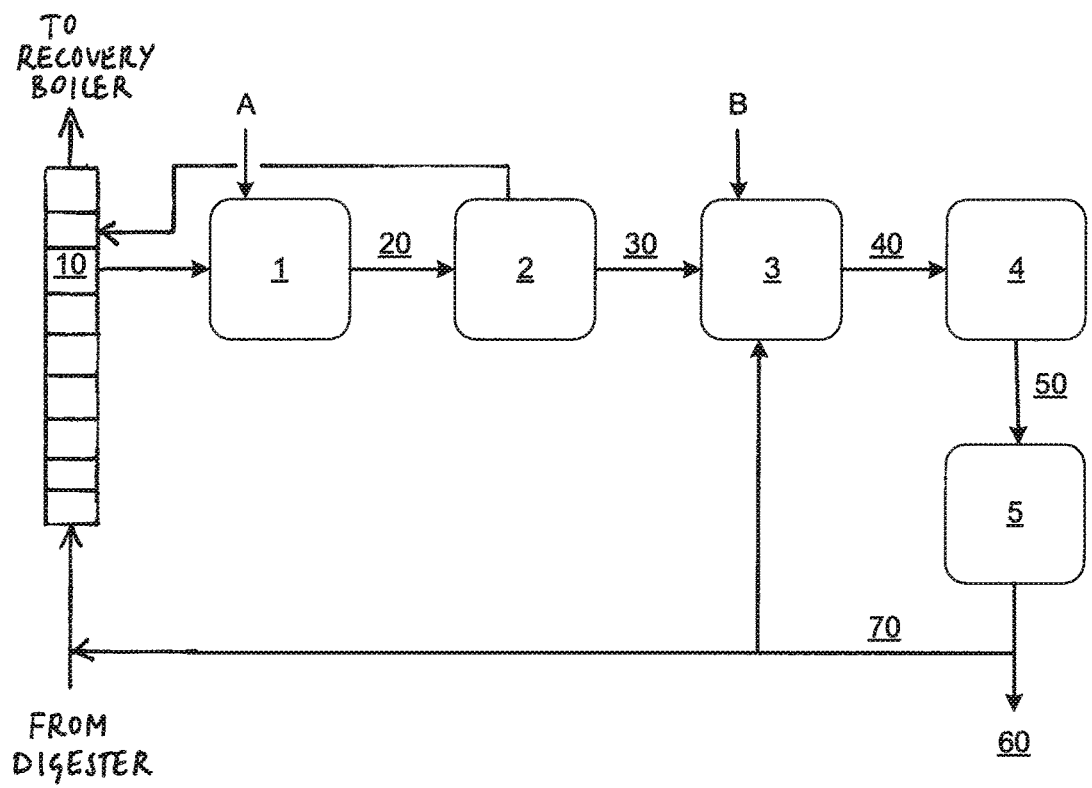
FIG. 1 shows a process flow chart according to an embodiment of the invention.

FIG. 1 shows a process flow chart, wherein lignin containing liquid medium 10 is fed to a lignin separation and treating process according to the invention for obtaining a carbon containing material 60 as an end product (carbon containing product). The lignin containing liquid medium is preferably concentrated black liquor, spent liquor from a cooking process that has already gone through several evaporation stages in its course to a recovery boiler where it will be burnt. The vertical arrow from bottom to top on the left side of the figure represents the flow of black liquor from a digester to the recovery boiler and the successive evaporation stages where the dry solids content of the black liquor increases are represented by squares. The evaporation stages can be a series of evaporators that are normally used for concentrating black liquor before the recovery boiler.

The black liquor is taken from the flow to the precipitation when it has not yet reached the final dry solids content where it is burnt in the boiler. The black liquor is taken to the precipitation at a dry solids content of about 30-45%.

However, it is understood that the black liquor, which contains lignin, can be taken at any point between the digester and the recovery boiler.

The process comprises a precipitation stage 1, wherein lignin is precipitated from the lignin containing liquid medium 10 by adding pH lowering agent A, followed by a first separation stage 2, wherein the precipitated lignin is separated as a lignin cake 30 from the remaining liquid phase of the lignin containing liquid medium 20 with lowered pH. The lignin cake 30 is suspended in a suspending stage 3 using water, wherein a lignin suspension 40 is obtained. Additional substances B, such as acid for adjusting the pH for the HTC stage can be added. For example sulphuric acid can be added. The lignin suspension 40 is treated in a hydrothermal carbonization (HTC) stage 4, wherein slurry of carbon containing material 50 is obtained, and the carbon containing product 60 (HTC carbon) is separated from the slurry in a second separation stage 5. A filtrate 70 of the second separation stage is circulated to the suspending stage 3 to be used as the suspending water and/or to a flow of the lignin containing liquid medium 10 coming from the digester. The filtrate is preferably circulated to the flow of lean black liquor before the evaporation stages. It is possible to use part of the filtrate for the suspending stage 3 and circulate part of the filtrate to the black liquor flow, as shown by FIG. 1. Sodium is separated from the lignin in the HTC process, and it is returned back to the black liquor with the filtrate.

The carbon containing product 60 can be washed after the separation of the filtrate 70 and dried.

The hydrothermal carbonization works in a wide variety of liquid/solid ratios of the lignin suspension.

FIG. 1 also shows the circulation of black liquor from the first separation stage 2 back to the flow of the black liquor in the evaporation stages.

Before the HTC stage 4, the pH of the lignin suspension is preferably adjusted to control the particle size of the carbon containing product 60. It is of particular importance to adjust the pH value of the lignin suspension to suppress the formation of too coarse particles, which is due to the polymerization of lignin during the HTC by the effect of $H^+$ ions. Thus, the pH of the suspension is preferably adjusted to be above 7, more preferably above 8. Further, it is advantageous that the pH during the HTC process is between 7 and 11, preferably between 8 and 10. The pH of the lignin suspension 40 is preferably adjusted so that it will be within these ranges during the HTC stage 4.

The particle size of the carbon containing product can be influenced by adjusting the $H^+$ ion concentration in the lignin suspension that is subjected to the HTC. By reducing the $H^+$ ion concentration of the lignin suspension the particle size of the product can be reduced. Thus, the choice of the pH for the HTC is dependent on the desired particle size. The particle size can be expressed for example by D90 value of the particle size distribution.

The pH can be adjusted to a suitable range for the HTC with acid (additional substance B) added in the suspending stage. However, either acids or bases can be used for the pH adjustment, depending on the initial pH of the suspension and the target pH value.

Figure 2:
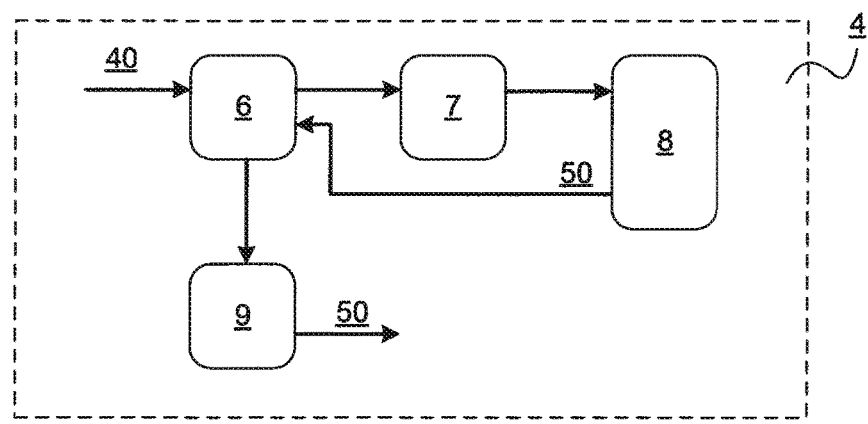
FIG. 2 shows a detailed process flow chart of a hydro thermal carbonization stage according to an embodiment of the invention.

FIG. 2 is a detailed process flow chart of a hydro thermal carbonization stage 4 according to an embodiment of the invention. The HTC stage may comprise a first heat exchanger 6 and a steam heater 7, through which a lignin suspension from the suspending stage 3 is conveyed before feeding it to a HTC reactor 8. Thus, the lignin suspension 40 can be preheated to the required temperature before the hydrothermal carbonization. At least one cooler 9 can be arranged after the HTC reactor 8 for cooling the slurry of carbon containing material 50. The slurry 50 from the HTC reactor 8 is conveyed through the heat exchanger 6 before the cooler 9, wherein the heat of the slurry of carbon containing material can be utilized in the preheating of the lignin suspension.

The carbon containing product can be dried to remove the remaining liquid, for example by evaporating the remaining liquid.

As can be seen in the preceding disclosure, the process of producing carbon containing material can be well integrated in the treatment of black liquor in a chemical pulp mill.

Many variations of the present invention will suggest themselves to those skilled in the art in light of the above detailed description. Such obvious variations are within the full intended scope of the appended claims.

The invention claimed is:

1. A method for separating lignin from a lignin containing liquid medium and treating the separated lignin, wherein the method comprises:
    precipitating lignin from the lignin containing liquid medium by adding a pH lowering agent to the lignin containing liquid medium,
    thereafter subjecting the lignin to a hydrothermal carbonization process in a wet state such that a slurry of carbon containing material is formed,
    recovering carbon containing material derived from the lignin as the result of the carbonization after the hydrothermal carbonization process, and
    adjusting the pH value of the lignin in the wet state before the hydrothermal carbonization process to a value above 8 so as to control particle size of the carbon containing material.

2. The method according to claim 1, wherein the lignin is subjected to the hydrothermal carbonization in a suspension.

3. The method according to claim 2, wherein the method further comprises the steps of:
    suspending the lignin in a liquid to make said suspension, and
    subjecting said suspension to the hydrothermal carbonization process.

4. The method according to claim 3, wherein the method comprises at least:
    a precipitation stage, wherein the pH lowering agent is added to the lignin containing liquid medium and lignin is precipitated,
    after the precipitation stage, a first separation stage, wherein the precipitated lignin is separated from a remaining liquid phase of the lignin containing liquid medium,
    after the first separation stage, a suspending stage, wherein the precipitated and separated lignin is suspended for obtaining a lignin suspension,
    after the suspending stage, a hydrothermal carbonization stage, wherein the lignin suspension is treated for obtaining a slurry of carbon-containing material, and
    after the hydrothermal carbonization stage, a second separation stage, wherein the carbon containing material is separated from the slurry.

5. The method according to claim 3, wherein the method comprises:
    separating the carbon containing material from the suspension after the hydrothermal carbonization,
    obtaining a liquid after separating the carbon containing material from the suspension, and suspending the lignin in said liquid to make a suspension for the hydrothermal carbonization process.

6. The method according to claim 5, wherein said liquid is a filtrate of a slurry of the carbon containing material.

7. The method according to claim 1, wherein the hydrothermal carbonization stage comprises heating the lignin in a wet state to a temperature of 150 to 250° C.

8. The method according to claim 7, wherein in the hydrothermal carbonization stage the lignin is heated at a pressure of 20 to 40 bar.

9. The method according to claim 1, wherein the lignin is subjected to the hydrothermal carbonization in a suspension at a pH value between 8 and 10.

10. The method according to claim 9, wherein the pH lowering agent is carbon dioxide.

11. The method according to claim 1, wherein the lignin containing liquid medium is liquid from a biomass conversion process.

12. The method according to claim 1, wherein the lignin containing liquid medium is black liquor.

13. The method according to claim 1, wherein the method comprises:
   making a carbon containing product by the hydrothermal carbonization process, and
   using the carbon containing product as a raw material for the production of tires, steel, electrode carbon or activated carbon.

14. The method according to claim 1, wherein the method comprises preheating the lignin in a wet state before conveying the lignin suspension to the hydrothermal carbonization stage.

15. The method according to claim 1, wherein the method comprises:
   separating the carbon containing material from the suspension after the hydrothermal carbonization,
   obtaining a liquid after separating the carbon containing material from the suspension, and
   circulating the liquid to the lignin containing liquid medium.

* * * * *